United States Patent
Marmet et al.

(10) Patent No.: US 10,585,195 B2
(45) Date of Patent: Mar. 10, 2020

(54) CEPSTRUM-BASED MULTIPATH MITIGATION OF A SPREAD SPECTRUM RADIOCOMMUNICATION SIGNAL

(71) Applicant: CENTRE NATIONAL D'ETUDES SPATIALES, Paris (FR)

(72) Inventors: François-Xavier Marmet, Muret (FR); Joël Dantepal, Eaunes (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 142 days.

(21) Appl. No.: 15/686,266

(22) Filed: Aug. 25, 2017

(65) Prior Publication Data

US 2018/0074207 A1  Mar. 15, 2018

(30) Foreign Application Priority Data

Sep. 13, 2016 (EP) .................................. 16306153

(51) Int. Cl.
*G01S 19/22* (2010.01)
*H04B 1/709* (2011.01)
*H04B 1/7113* (2011.01)

(52) U.S. Cl.
CPC .............. *G01S 19/22* (2013.01); *H04B 1/709* (2013.01); *H04B 1/7113* (2013.01); *H04B 2201/709709* (2013.01)

(58) Field of Classification Search
CPC ..... G01S 19/22; H04B 1/1709; H04B 1/7113; H04B 2201/709709
USPC .................................................. 342/357.61
See application file for complete search history.

(56) References Cited

U.S. PATENT DOCUMENTS

| 5,111,298 A | * | 5/1992 | Koo | ........................ H04L 1/242 348/611 |
| 6,031,882 A | * | 2/2000 | Enge | ...................... H04B 1/711 375/343 |
| 2013/0189921 A1 | * | 7/2013 | Maca | ................. H03H 17/0216 455/9 |

OTHER PUBLICATIONS

Yang Chun et al. "Frequency-Domain Characterization of GPS Multipath for Estimation and Mitigation," GNSS 2005-Proceedings of the 18th international technical meeting of the satellite division of the institute of Navigation (ION GNSS 2005), USA, pp. 2104-2118 (Year: 2005).*

(Continued)

*Primary Examiner* — Bo Fan
(74) *Attorney, Agent, or Firm* — Meagher Emanuel Laks; Goldberg & Liao, LLP (57) ABSTRACT

Receiver and method for receiving one or more RF signals, the RF signals comprising a component relative to a direct propagation path and, depending on a propagation environment, one or more additional components relative to reflected propagation paths, the receiver comprising a calculation circuit configured to:
compute at least a first correlation function (310) between the received signal and at least a replica of a RF signal generated at the receiver, and for at least an output of said first correlation function:
perform a cepstrum transform (410),
search for one or more reflected propagation paths from the output of the cepstrum transform (411), and when reflected propagation paths are detected, determine the associated propagation characteristics (412), and
remove the contribution of the detected reflected propagation paths from one of the received signal or the output of the first correlation function.

10 Claims, 8 Drawing Sheets

(56) References Cited

OTHER PUBLICATIONS

Michael Steckner et al. "Fast Cepstrum Analysis Using the Hartley Transform," Aug. 31, 1989, IEEE Transactions on Acoustics, Speech, and Signal Processing, vol. 37, No. 8, pp. 1300-1302 (Year: 1989).*
European Search Report for 16306153.4 dated Mar. 8, 2017.
Yang Chun et al: "Frequency-Domain Characterization of GPS Multipath for Estimation and Mitigation", GNSS 2005—Proceedings of the 18th International Technical Meeting of the Satellite Division of the Institute of Navigation (ION GNSS 2005) the Institute of Navigation, 8551 Rixlew Lane Suite 360, Manassas, VA 20109, USA, Sep. 16, 2005 (Sep. 16, 2005), pp. 2104-2118.
Michael C Steckner et al: "Fast Cepstrum Analysis Using the Hartley Transform", IEEE Transactions on Acoustics, Speech, and Signal Processing, vol. 37, No. 8, Aug. 31, 1989 (Aug. 31, 1989), pp. 1300-1302.
N. Delgado, F. Nunes, "Theoretical Performance of the MEDLL Algorithm for the New Navigation Signals", 7th conference on Telecommunications, 2009.

\* cited by examiner

Prior art

CEPSTRUM-BASED MULTIPATH MITIGATION OF A SPREAD SPECTRUM RADIOCOMMUNICATION SIGNAL

FIELD OF THE INVENTION

The present invention applies to the field of spread spectrum radio communications, notably satellite radio-navigation. More specifically, the invention describes a GNSS receiver configured to track a satellite positioning signal in a multipath propagation environment.

BACKGROUND PRIOR ART

There are two Global Navigation Satellite Systems (GNSS) which have been fully deployed for a number of years (the US Global Positioning System and the Russian GLONASS) and two more which are under deployment (the Chinese Beidou Navigation Satellite System and the European Galileo system). These systems rely on the same principles: microwave radio frequency (RF) signals are broadcast from a number of satellites which orbit; the signals carry a PRN (Pseudo Random Noise) code which is correlated with a local replica in a receiver configured to receive the broadcast signals; when a receiver is capable of acquiring and tracking signals from a satellite, its processing capabilities demodulate the code signal using the correlation process, and calculate a pseudo-range, which is the distance between the receiver and the satellite. This pseudo-range is taken in combination with pseudo-range acquired from other satellites (generally four, or three when the altitude estimate is not needed) to determine a position, velocity and time (PVT).

Positioning messages are usually made of a navigation message, comprising information including the satellites' position, ephemerides, and the message transmission time. The navigation message is further modulated by a PRN (Pseudo Random Noise) code with each satellite using a distinct PRN code, so that the GNSS receivers can isolate the signal originating from one particular satellite. These signals usually use a BPSK (Binary Shift Keying) or a BOC (Binary Offset Carrier) modulation, depending on accuracy and spectral occupation considerations.

However, depending on the propagation environment, the signal received by a GNSS receiver from one satellite may result from the combination of Line Of Sight (LOS) and Non Line of Sight (NLOS) paths of the signal, the LOS path being the direct propagation path between the satellite and the receiver, and the NLOS paths the results of reflections occurring. The NLOS signals are delayed replicas of the LOS signal, with a potentially different amplitude and phase, the delay being a function of the difference of distance between the direct propagation path and the reflected propagation path. Multipath reflections are particularly present when the GNSS receiver operates in an urban or indoor environment.

The NLOS components of such a multipath signal create artifacts in the composite correlation function of the received signal, which is used to synchronize the receiver and determine a pseudo range with the satellite. The artifacts decrease the quality of the synchronization position determined, and thus affect the quality of the overall estimate. As a result, the accuracy of the positioning will tend to be worse in urban environment than in rural environment (where trees are not present), while this is where a high accuracy is required.

In addition, the signal received by a GNSS receiver comprises at the same time the signal and associated multipath reflections transmitted by all the satellites in sight, which further complicates the reception process.

Different techniques are known to deal with the issue of detecting and correcting multipath reflections in a received signal. Among these techniques are the equalization techniques (linear equalization, decision feedback equalizer, adaptive filter, Viterbi equalizer, Rake receiver . . . ), aiming at combining the NLOS components of the received signal with the LOS component. However, these techniques are not necessarily adapted to equalize a spread spectrum signal operating at low SNR (acronym for Signal over Noise Ratio), and may require a learning phase in order to characterize the propagation channel, which increases the time required to lock a position, and thus may not be compatible with a receiver moving in an urban environment because, in that case, the propagation channel changes quickly. In addition, when based on an estimation of the propagation channel, these techniques are not suited to perform this estimation when the received signal is a combination of various signals originating from different transmitters.

U.S. Pat. No. 6,031,882 describes various methods to estimate the characteristics of the propagation channel and mitigate multiple propagation paths.

Among these methods is a first method, called "slope transition method", which determines the delay of the multipath reflections by analyzing the slope of the output of the correlation function between the received signal and a local replica of the signal. The complex gain of each multiple path is then estimated using a least square method between the received signal and a reconstructed multipath signal. Knowing their respective delays and complex amplitudes, the multipath reflections can be suppressed from the received signal. This method suffers from the lack of precision of the slope transition analysis when the noise level is high, and requires a high processing power to determine the amplitudes of the reflected propagation paths.

A second method described in the above referenced US patent is called the "cepstrum processing approach", wherein the delays of the various paths are estimated performing a complex cepstrum transform on the received signal, the cepstrum transform being the inverse Fourier transform of the log-magnitude Fourier spectrum. The path delays can be directly determined from the result of this transform. The complex gain of the various paths are then estimated using a least square method between the received signal and a reconstructed multipath signal, in order to remove the multipath reflections from the received signal. This method still requires a high processing power to determine the complex gain of the multipath reflections, and is not adapted when the received signal is the sum signal originating from different satellites, each signal having its own multiple paths, as the cepstrum transform will mix reflections occurring on the signal of interest, and reflections occurring on the other positioning signals.

Another multipath estimation technique is called the Multipath Estimating Delay Lock Loop (MEDLL). This technique is described in N. Delgado, F. Nunes, "Theoretical Performance of the MEDLL Algorithm for the New Navigation Signals, $7^{th}$ conference on Telecommunications, 2009. The MEDLL algorithm estimates the amplitude, delay and phase of each multipath component using a maximum likelihood criteria from the output of a correlation function between the received signal and a local replica of the signal. The various paths of the received signal are estimated one by one iteratively: the direct path is estimated from the maximum of the correlation result, and its contribution subtracted from the output of the correlation. Then the multipath having the highest power level can be estimated and subtracted, and so on. When a given number of multiple paths are detected, their contributions are removed from the output of the correlation result, so that it only comprises the LOS path The MEDLL algorithm shows good theoretical results, but requires a high processing power and the knowledge of the total number of multiple paths, or specific criteria to stop iterating the multiple path detections.

There is accordingly a need for estimating and mitigating the multipaths signals with low processing computation at the correlation step.

SUMMARY OF THE INVENTION

It is an object of the invention to provide improvements over the prior art by describing a GNSS receiver configured to mitigate the effects of the multiple paths in an efficient way.

To this effect, the invention discloses a receiver for receiving one or more RF signals. Each RF signal comprises a component relative to a direct propagation path and, depending on a propagation environment, one or more additional components relative to reflected propagation paths.

The receiver comprises a calculation circuit configured to compute at least a first correlation function between the received signal and at least a replica of a signal generated at the receiver, and for at least an output of said first correlation function:
 perform a cepstrum transform,
 search for one or more reflected propagation paths from the output of the cepstrum transform, and when reflected propagation paths are detected, determine the associated propagation characteristics.

The receiver is further configured to remove the contribution of the detected reflected propagation paths from one of the received signal or the output of the first correlation function.

The invention will be described in a context of a particularly advantageous application that concerns GNSS receivers configured to receive one or more positioning signals. A person of ordinary skill in the art of radio frequency communications will easily transpose the use of invention to other kinds of RF receivers using a spread-spectrum modulation technique.

According to a first embodiment of the invention, the propagation characteristics determined for each of the reflected propagation paths found by the receiver comprising an amplitude and a delay. The calculation circuit of the receiver is further configured to generate an output of a second correlation function based on the estimated propagation characteristics of each of the detected reflected propagation paths by calculating a difference between the output of the first correlation function and the output of the second correlation function, and using this difference instead of the initially calculated output of the first correlation function for further processing.

According to another embodiment of the invention, the propagation characteristics determined for each of the reflected propagation paths found by the receiver comprising an amplitude, a phase and a delay. The calculation circuit of the receiver is further configured to use the estimated propagation characteristics of the detected reflected propagation paths to calculate a Finite Impulse Response filter, and to use said filter to remove the contributions of the reflected propagation paths from the received signal. Once filtered, the clean version of the received signal is used as in standard GNSS receiver for further processing.

In each embodiment of the invention, the search for the reflected propagation paths can be performed iteratively. In that case, the cepstrum transform, the search for reflected propagation paths and the determination of associated propagation characteristics estimation are performed iteratively. The subsequent iterations take the output of the first correlation function as an input after removing from said function the previously detected reflected propagation paths.

Advantageously, the cepstrum transform processed comprises a Hartley transform and an inverse Hartley transform.

According to one embodiment of the invention, the first correlation function is computed in the frequency domain.

Advantageously, the receiver according to the invention is further configured to perform the cepstrum transform, reflected propagation paths detection, associated propagation characteristics detection and contribution removal during at least a phase of tracking of the signal.

The invention also relates to a method for mitigating multiple paths in a receiver configured to receive one or more signals, the signal comprising a component relative to a direct propagation path and, depending on a propagation environment, one or more additional components relative to reflected propagation paths. The method according to the invention comprises:
 a step of computing at least one first correlation function between the received signal and at least one local replica of a positioning signal, and for at least one of said first correlation functions:
  a step of performing a cepstrum transform on the output of said correlation function,
  a step of searching for one or more reflected propagation paths from the output of the cepstrum transform, and when reflected propagation paths are detected, determining the associated propagation characteristics,
 a step of removing the contribution of the detected reflected propagation paths from one of the received signals or the output of the first correlation function.

The method according to the invention applies advantageously to GNSS receivers configured to receive one or more positioning signals.

BRIEF DESCRIPTION OF THE DRAWINGS

The invention will be better understood and its various features and advantages will emerge from the following description of a number of exemplary embodiments and its appended figures in which.

The examples disclosed in this specification are only illustrative of some embodiments of the invention. Further advantages of the present invention will become clear to the skilled person upon examination of the drawings and the detailed description. It is intended that any additional advantages be incorporated herein.

DETAILED DESCRIPTION OF THE INVENTION

Figure 1:
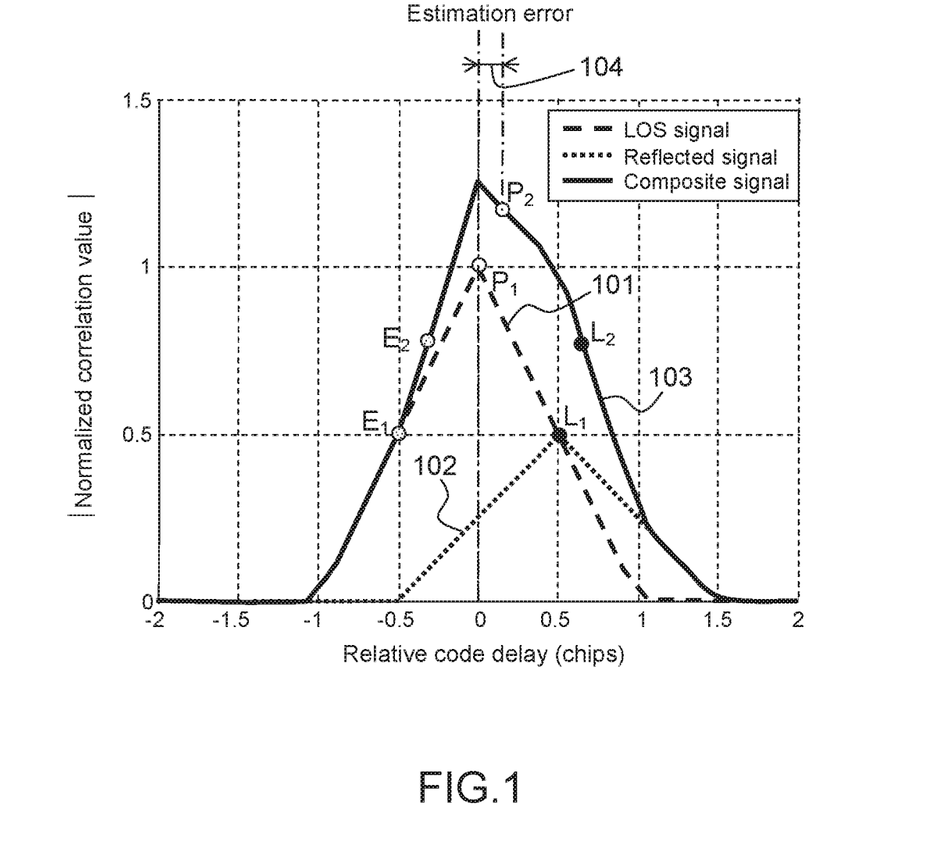
FIG. 1 describes the effects of multiple paths reflections on a correlation performed on a GNSS signal received in a receiver according to prior art.

FIG. 1 describes the effects of multiple paths reflections on a correlation performed on a GNSS signal received in a receiver according to prior art.

In what follows, and for illustration purposes, the figures will refer to a positioning signal transmitted using a BPSK modulation, but the invention applies equally over a positioning signal transmitted using a BOC modulation, or any other relevant modulation using spreading.

The receiver correlates the received signal with at least one local replica of the positioning signal. The local replica is generated considering the signal originating from one satellite and the PRN code associated, plus a local time reference of a tracking loop associated to this signal. This operation is performed in a tracking loop of the received signal, the aim of the tracking loop being to:

isolate the signal coming from one particular GNSS transmitter, thanks to the PRN code used to modulate the navigation message contained in the positioning signal, and
  determine precisely the time of arrival of the received positioning signal.

To this end, the position of the maximum of the output of the correlation function is tracked.

The curve 101 in FIG. 1 illustrates the value of the modulus of the normalized correlation function performed in a tracking loop, when the received signal is only made of a LOS signal. The output of the correlation function is symmetric, and reaches a maximum value at a point corresponding to the perfect synchronization instant.

The result of a correlation product is a complex value. Hereafter, unless indicated otherwise, the correlation product considered is the modulus of the correlation product, which is, by definition, a real value.

In order to limit the receiver's processing power required when tracking the position of the maximum of the correlation function, the correlation function between the received signal and its local replica is only computed at specific moments around the expected time of arrival of the signal. Thus, the tracking loop comprises a local oscillator (NCO) which aim is to synchronize over the received signal, and to pilot the correlation function processing. To this end, for each measurement, the tracking loop estimates a time shift that has to be compensated. Actual GNSS receivers implement synchronization techniques, like for instance the early minus late technique, wherein the correlation function calculation is not performed continuously over a limited period of time, but on only three specific positions: a prompt (P1) position, calculated at the time the received PRN code is expected based on the time shift estimate, an early (E1) and a late (L1) positions, equally time shifted from the prompt correlator, the spacing between the early and late correlators, also referred to as E-L spacing, being typically lower than one chip. These three correlation calculations are performed regularly, e.g. at each period of the PRN code.

For example, for GPS L1CA signal, the chip rate, i.e. the number of chip in one second, is 1.023 MHz. Consequently, the chip duration is about 0.97752 µs which corresponds to 293.05 m Depending on the value of the prompt correlator, it is possible to determine if the tracking loop is locked on the received signal. Depending on the relative value of the Early, Prompt and Late correlation values, it is possible to estimate if the local time reference has to be shifted, and in which direction. For that purpose, the equilibrium point, which is the point where the early and prompt correlation values are essentially equal, is determined. More sophisticated techniques are known, using for example five positions or a more sophisticated combination of the correlation values to estimate the direction and value of the time shift. These techniques show better results to the price of a slightly higher implementation cost.

The correlation value relative to a signal reflection on the propagation environment has the same shape than the correlation value due to the direct path, but is delayed, and it may be attenuated. The curve 102 illustrates the normalized correlation value of a reflected propagation path.

The normalized correlation value of a signal comprising a direct path and one reflected propagation path is illustrated in 103. It is the sum of the result of correlation functions calculated for each of the received paths.

The result of a synchronization method based on an early (E2), prompt (P2) and late (L2) correlation value when operating on a received signal comprising multiple path reflections can be biased, as the equilibrium point of the output of the correlation function has changed. Indeed, the resulting correlation curve is no more symmetrical, which leads to a measurement bias 104 when estimating the synchronization position. This bias has a direct impact on the pseudo-range estimated and then the accuracy of the positioning.

A mathematical function, called the cepstrum transform, is known from prior art. This function has been developed to characterize the seismic echoes resulting from earthquakes and bomb explosions. It has also been used to determine the fundamental frequency of human speech and to analyze radar signal returns.

A signal y(n) that is received after being reflected once, can be expressed as:

$$y(n)=x(n)*(\delta(n)+\alpha_1\delta(n-\tau_1)) \qquad (1)$$

where:
  x(n) is the direct path of the received signal,
  δ(n) is the Dirac distribution,
  * is the convolution product,
  $\alpha_1$ is the complex gain of the reflected propagation path of the received signal,
  $\tau_1$ is the delay of the reflected path of the received signal.

The complex cepstrum of y(n) is obtained calculating the inverse Fourier transform of the logarithm of the Fourier transform of y(n):

$$\Phi(y(n))=FT^{-1}(\log(FT(y(n)))). \qquad (2)$$

and can be expressed as in KEMERAIT, CHILDERS, "Signal Detection and Extraction by Cepstrum Techniques", November 1972 IEEE-TIT:

$$\Phi(y(n)) = \Phi(x(n)) + \left( \sum_{r=1}^{\infty} \frac{(-1)^{r+1}}{r} \alpha_1^r \delta(\tau - r\tau_1) \right). \quad (3)$$

Thus, the complex cepstrum of a signal comprises information about the delay, amplitude and phase of the reflected paths of the received signal.

Figure 2:
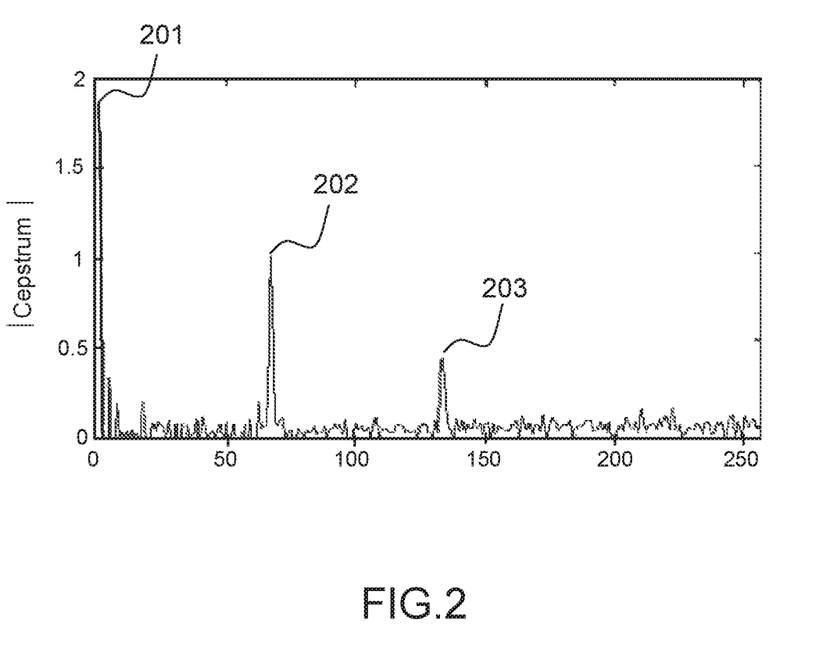
FIG. 2 illustrates the results of a cepstrum transform on the output of a correlation function, for a received signal comprising one direct path and one additional reflected propagation path.

FIG. 2 illustrates the result of a cepstrum transform performed on a signal comprising one direct path and one additional reflected propagation path.

The direct path is the peak of maximum amplitude 201 positioned at the start of the output of the cepstrum transform, while the contribution of the reflected path can be observed as peaks 202 and 203 of decreasing amplitude evenly spaced at distances that are relative to the propagation delay (relative_distance=vacuum_speed*relative_propagation_delay). From this cepstrum transform, the delay of the reflected signal, relatively to the LOS path, can be measured, as well as its amplitude and phase, from the complex value of the gain $\alpha$.

When performed over a real signal, like the modulus of the output of a correlation function in FIG. 2, a real cepstrum transform, having a lower implementation cost, can be processed. However, the resulting coefficient $\alpha$, which is the gain associated to the reflected path, is a real value. Thus, the output of the real cepstrum transform comprises information about the delay and amplitude of the reflected signal only, not the phase information.

Using the cepstrum transform, the delay and amplitude relative to each of the reflected propagation paths can be retrieved. If the cepstrum transform is a complex cepstrum, it is also possible to retrieve the phase of the reflected propagation paths.

Figure 3:
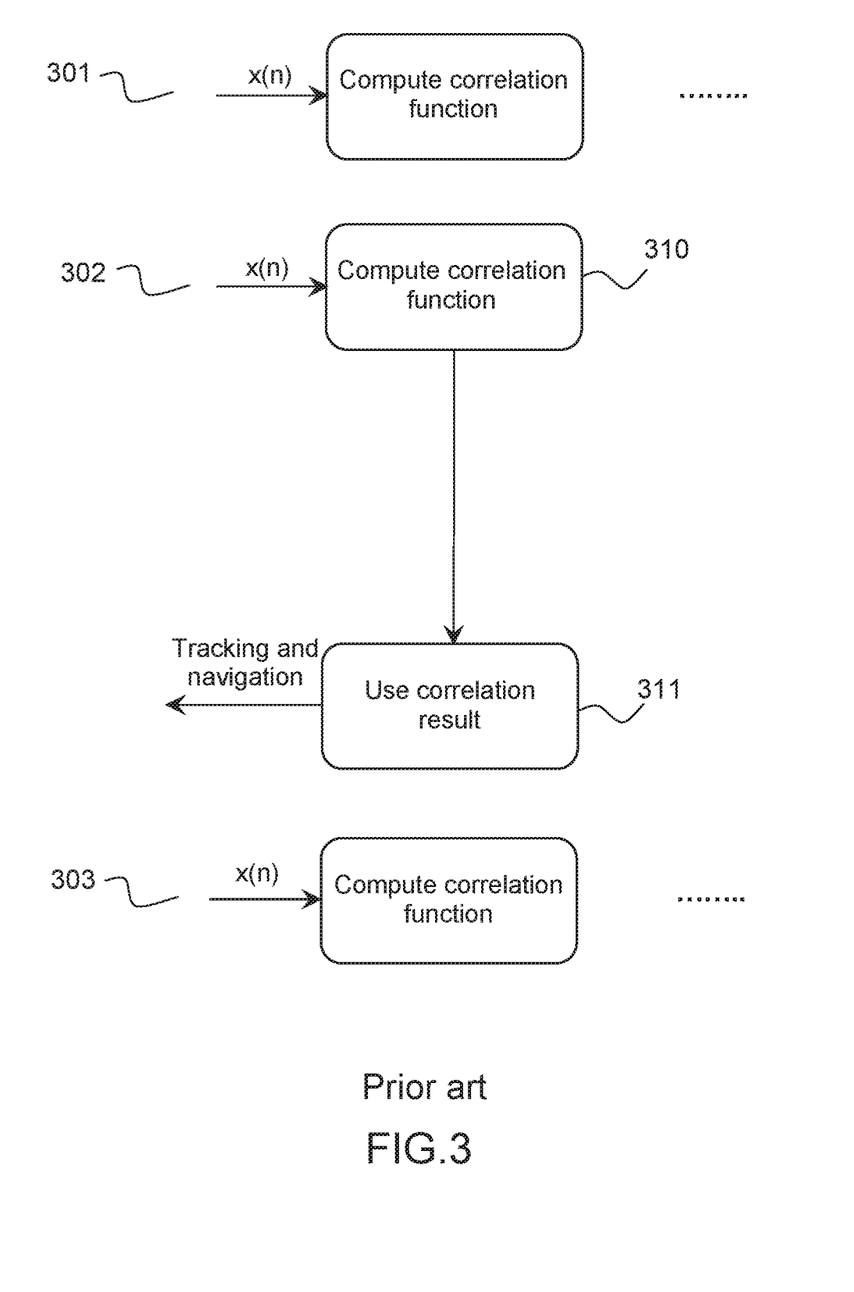
FIG. 3 represents the synchronization process performed in a state of the art GNSS receiver.

FIG. 3 represents the synchronization process performed in a state of the art GNSS receiver.

The standard correlation based tracking structure used in prior art GNSS receivers is based on a feedback-delay estimator and is implemented via a feedback loop, which is known as tracking loop. Each tracking loop is dedicated to the tracking of one satellite by considering a specific PRN code. The GNSS receiver comprises a plurality of tracking loops (301, 302, 303), each of them implementing one or more correlation functions computed between the received signal x(n) and local replicas of the positioning signal, depending on the synchronization method which is implemented. The replicas of the positioning signal are generated by the receiver based on the PRN sequence associated to the satellite which is tracked, and a local time information delivered by the tracking loop associated to said satellite.

To perform a complete Position, Velocity and Time estimation (PVT), a minimum of four tracking loops, tracking distinct positioning signals, are required. An additional tracking loop may help improving the accuracy of the measurement, while using a lower number of tracking loops is possible when variables are already known (e.g. when one of the (x, y, z) position of the receiver is fixed or known or when the GNSS receiver is only used to synchronize devices).

The results of the correlation function are processed in a feedback loop to drive a local oscillator. To this end, discriminators are calculated (311) from the output of the correlation function and used to drive a Phase Locked Loop (PLL) and a Delay Locked Loop (DLL). A pseudo range is then constructed, using the phase of the DLL and a received navigation message. One technique known to determine the DLL discriminator value is the early minus late technique, described previously, wherein three correlators positioned at specific intervals from each other are used in the receiver, but other techniques are known, like the Double Estimation technique, or the Double Discriminator technique. The calculated pseudo range is used jointly with the pseudo ranges computed using the other tracking loops to determine the PVT.

Figure 4:
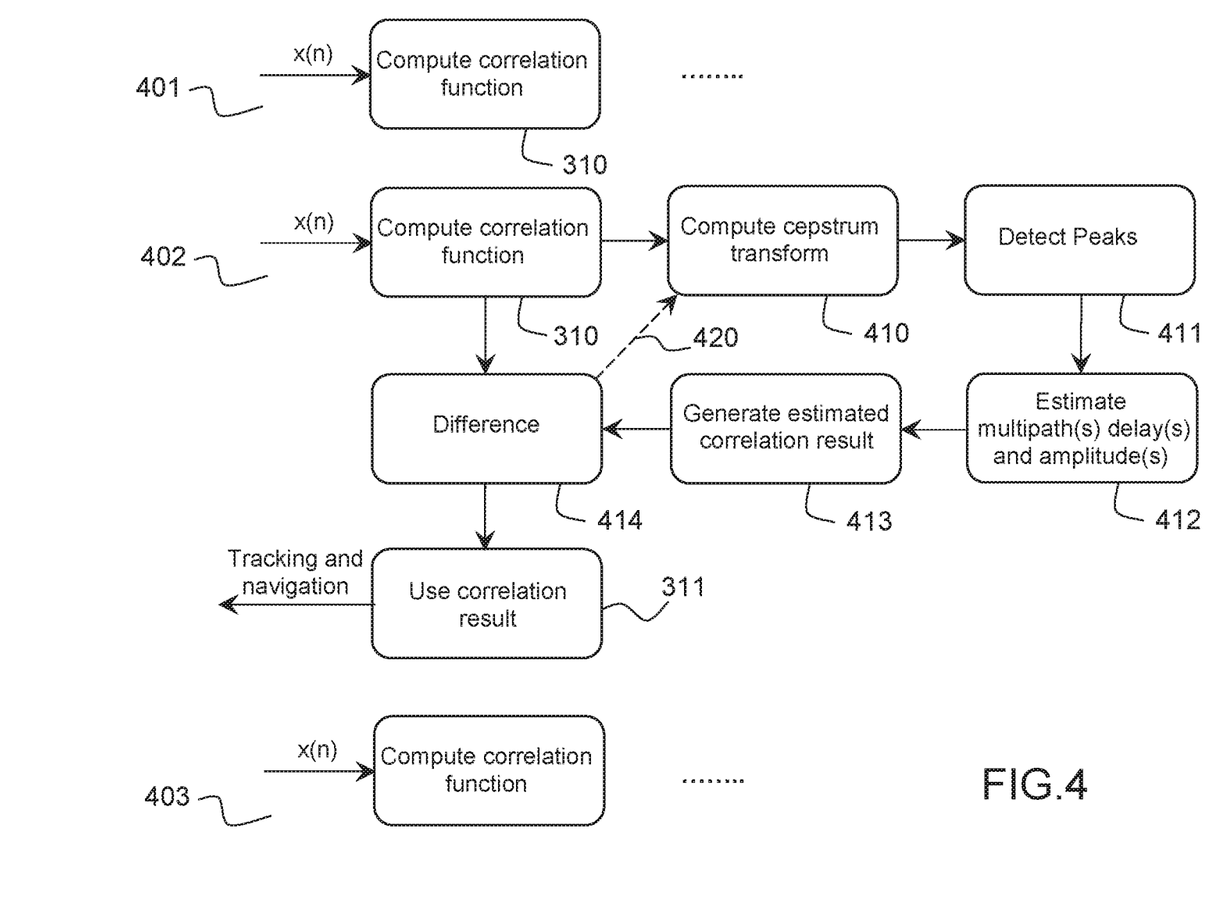
FIG. 4 illustrates a first embodiment of the invention, wherein multipath reflections are identified using a cepstrum transform, and removed from the output of the correlation function.

FIG. 4 illustrates a first embodiment of the invention, wherein multipath reflections are identified using a cepstrum transform, and removed from the output of the correlation function. The received signal is a combination of a plurality of positioning signals originating from distinct satellites, or any other equipment configured to transmit a GNSS positioning signal, as for instance GNSS repeaters.

The receivers according to the invention use a same architecture as standard GNSS receivers, which comprise a plurality of tracking loops 401, 402 and 403, the number of tracking loops being an implementation choice.

For each tracking loop, a first correlation function 310 between the received signal and a local replica of a positioning signal is computed. However, in order to be compliant with further processing, the correlation function must be performed on a set of consecutive points (i.e. more than the usual three points).

The number of points and the sampling rate considered to perform the correlation impact the maximum delay and precision of the multipath estimation. The performances of the algorithms will be improved when considering a high number of points and a high sampling rate, at the expense of an increase of the required processing power. A compromise between processing power and performances, based on considerations about the hardware platform and the propagation environment, has to be done on a case by case basis. As an example, for the GPS L1C/A signal, a good compromise could be performing a correlation on 50 consecutive points, which enables estimating multipath up to 1 µs.

Unlike what is done in standard receivers, the invention proposes to compute a cepstrum based transform 410 on the output of the correlation function calculated to identify and characterize the multipath reflections. This cepstrum transform can be real or complex. The received signal is the sum of a LOS signal and one or more NLOS signals. As the correlation function is a linear function, the output of the correlation function is the sum of the output of a correlation function performed on the LOS signal, plus the output of the correlation functions performed on each of the NLOS signals. Then, estimating the echoes' parameters at the correlation function level is mathematically equivalent to estimating them from the received signal. However, the received signal comprises the positioning signals transmitted by each of the satellites in view, while the correlation signal only comprises the signal of interest, thanks to the correlation process. Thus, the level of noise due to interferences with other positioning signals is a lot lower, and the multipath reflections detection and characterisation can be performed more easily and accurately.

In terms of implementation, a cepstrum transform comprises a Fourier transform and an inverse Fourier transform, the size of which may be chosen in order to match the size of the set of consecutive values being an output of the correlation function. Conversely, the size of the set of correlation values may be advantageously chosen so that Fast Fourier Transforms (FFT) and inverse Fast Fourier transform (IFFT) can be implemented to perform the cepstrum transform.

When operated over the modulus of the output of the correlation function, the cepstrum transform implemented can be a real cepstrum transform, which requires less processing power than the complex one. Advantageously, a Hartley transform (and inverse Hartley transform) can be implemented instead of the Fourier transform (and inverse Fourier transform), as the Hartley transform provides results similar to a Fourier transform on real values, even though it requires less processing power than a Fast Fourier transform.

The way to use a Hartley transform to perform a cepstrum analysis is described in details in the article: MICHAEL C. STECKNER, DICK J. DROST, Fast Cepstrum Analysis using the Hartley Transform, IEEE Transaction on acoustics, speech and signal processing, vol. 37, N°8, August 1989.

In the first embodiment of the invention, amplitudes and delays of the multipath reflections are the only parameters required. This embodiment may therefore use real cepstrum transform of the modulus of the correlation result, performed on the in-phase channel of the correlation stage only. This provides the advantage of decreasing the processing complexity, and therefore reducing the footprint and being quicker to compute.

The result of the cepstrum transform of the correlation has to be analyzed in order to detect peaks (411). Indeed, peaks relate to multipath reflections of the positioning signal, with respect to the formula (3).

The resolution of the cepstrum analysis is the capacity to separate two consecutive echoes. According to equation (3), a multipath appears in the cepstrum transform as a sum of Dirac functions. Following the Rayleigh criteria, the cepstrum analysis resolution is $1/f_s$. Thus, considering a sampling frequency of 20 MHz for instance, the cepstrum transform gives the possibility to detect two echoes relatively delayed of 15 m.

To detect the peaks of the cepstrum transform, a threshold can be set, and all the peaks that are above said threshold identified as multipath reflections. The detected peaks may then be sorted out, so that peaks separated by distances and having amplitudes in line with equation (3) are grouped together. In detection theory, the definition of the threshold is generally defined with Gaussian noise assumptions. And despite the logarithmic function, this assumption could still be considered in the cepstrum application. Consequently, the detection and false alarm probabilities, used to compute threshold, can be defined in usual ways (likelihood ratio test for example).

The periodicity of the peaks could be exploited in order to improve the detection, as for instance by performing the sum of values of the cepstrum transform chosen at various intervals. That way, the peaks corresponding to reflected path are magnified, while the parasite peaks, corresponding to noise, stay at a low level.

Smoothing the result of the cepstrum transform, or the values measured on successive cepstrum transforms, can also be done to further improve the detection. Indeed, if discriminating the multiple propagation paths might be difficult at a given time, changes in the propagation environment could ease this operation for the subsequent measurements.

Any other suitable method to detect peaks in the cepstrum transform and to associate these peaks with reflected propagation paths may be used in place of this one.

Next operation 412 consists in processing the results of the cepstrum transform to estimate the propagation characteristics for each of the multipath reflections associated with the detected peaks. In that case, the propagation characteristics are the delay and amplitude of each reflected propagation path.

For instance, the delay and amplitude of each multipath reflection can be measured considering the first peak of the cepstrum transform associated with this reflection. The value of this peak is $\alpha_1 \delta(\tau - r\tau_1)$. When the cepstrum transform is a real cepstrum transform, $\alpha_1$ is a real value, and represents the relative amplitude of the reflected path. When the cepstrum transform is complex, $\alpha_1$ is a complex value, which modulus represents the amplitude of the reflected propagation path. Alternative methods might consist in measuring these parameters on a plurality of peaks associated to this path, and performing a weighted average.

Once the delay and amplitude of each significant multipath reflection have been estimated, an estimated multipath-only correlation result can be generated (413). To that end, the calculation of the correlation function obtained by correlating the local replica of the received signal with a composite version of the signal, comprising the reflected propagation paths only, can be performed. The composite version of the signal is constructed by adding a weighted and delayed version of the replica of the signal for each of the multiple paths. Alternatively, it can be taken advantage from the fact that the result of the correlation between a reflected propagation path and the local replica of the signal is an attenuated and delayed version of the correlation between the LOS part of the received signal and the local replica. As the result of the correlation function relative to a single path is known (see 101 in FIG. 1 for example), the estimated multipath correlation result can be generated as the sum of the correlation results associated to each of the multipath reflections. The correlation result associated to one signal multipath is the theoretical correlation result 101 shifted of a distance relative to the multiple path delay, and amplified or attenuated depending on the value of the multipath amplitude $|\alpha_1|$.

A difference 414 between the output of the first correlation 310 and the output of this second, estimated, multipath correlation 413 is performed, in order to generate an output of a correlation function where the contributions of the estimated multiple paths have been removed.

In a less optimal option, the contribution of the estimated reflected propagation paths can be removed one by one.

Thus, as the original correlation function is the sum of the LOS correlation function and the NLOS correlation functions, the calculated correlation function output is theoretically equal to the LOS correlation function output, and it can be used in further processing as in standard GNSS receivers. As it is a multipath-free version of the correlation between the received signal and a local replica of the signal generated at the receiver, using techniques like the early minus late technique introduced in previous examples to calculate the discriminator driving the local oscillator of the tracking loop is possible and no longer biased.

In an alternate implementation of the first embodiment of the invention, the steps of performing a cepstrum transform, detecting peaks, estimating the associated delays and amplitudes, generating an estimated correlation result relative to the multipath reflections and subtracting this correlation result from the original correlation output, are performed iteratively (420).

Thus, the cepstrum transforms performed during the successive iterations are based on a correlation signal where the main multipath reflections have been deleted. As a result, low amplitude multipath reflections, which were previously hidden below the high amplitude multipath reflections, can now be detected.

One can choose to limit the number of iterations, or to stop iterating when specific events occur, like a specific number of detected peaks, or when the amplitude of the detected peaks is below a threshold. It has to be noted that one or more peaks can be detected during each iteration.

Figure 5A:
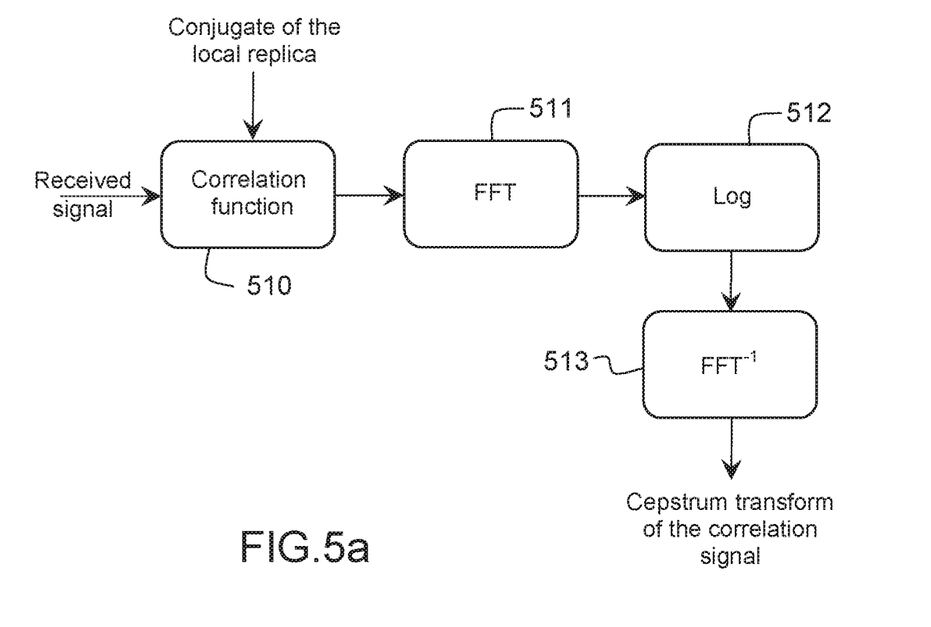
FIGS. 5a and 5b show various implementations for processing the correlation calculation and cepstrum transform.
Figure 5B:
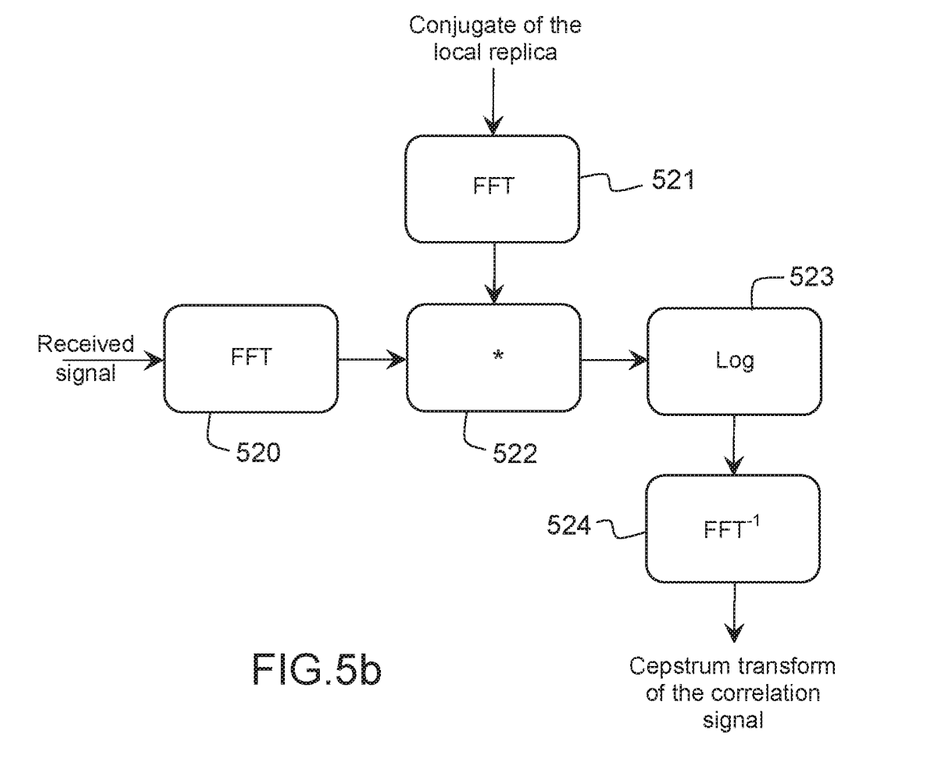

FIGS. 5a and 5b show various implementations that can be considered for processing the correlation function calculation and the cepstrum transform.

In FIG. 5a, the correlation function calculation and the cepstrum transform are computed sequentially. The received signal is correlated in 510 with a conjugate of the replica of the positioning signal built using the local oscillators. A Fourier transform 511, which can either be a Fourier transform, a Fast Fourier transform or a Hartley transform when considering a real signal, is performed on the result of the correlation function. A logarithm 512 is then applied to the output of the Fourier transform, and an inverse Fourier transform (Fast Fourier or Hartley) 513. The output of the inverse Fourier transform is a complex or real cepstrum transform of the correlation signal.

The positions of the Fourier transform and the inverse Fourier transform can be inverted without any consequence on the result.

In FIG. 5b, the correlation function calculation and cepstrum transform are performed jointly, in a cepstrum correlation transform.

Indeed, a correlation in the time domain is equal to a multiplication in the frequency domain, that is to say:

$$FT(X \otimes Y) = FT(X) \cdot \text{conj}(FT(Y)) \quad (4)$$

with $\otimes$ being the correlation product, X and Y being vectors, and $$FT^{-1}(\log(FT(X) \cdot \text{conj}(FT(Y)))) = \quad (5)$$
$$FT^{-1}(\log(FT(FT^{-1}((FT(X) \cdot \text{conj}(FT(Y)))) = FT^{-1}(\log(FT(R_{corr}))).$$

Thus, a Fourier transform (520, 521) is applied separately to the received signal and to the conjugate of the replica of the positioning signal built using the local oscillators. The results are multiplied, before a log function 523 and an inverse Fourier function 524 are applied to the product of 520 and 521.

When considering a complex cepstrum transform, or a real cepstrum transform not based on Hartley transforms, the outputs of FIGS. 5a and 5b are bit equals. However, the joint process of the correlation function and cepstrum transform is not possible when implementing real cepstrum transform based on Hartley transforms instead of Fourier transforms.

The main advantage of the joint process, i.e. correlation and cepstral analysis at same time (FIG. 5b), is to use directly the baseband signal and not the correlation function. In practice, this method avoids the need of two blocks of Fourier transform (classical and inverse).

As in FIG. 5a, the positions of the Fourier transform and the inverse Fourier transform can be inverted without any consequence on the final result.

Thus, if the implementation strategy is to perform massive correlating functions in parallel, the method of FIG. 5a is the more relevant, while the method of FIG. 5b is more appropriate when the processing power is more constrained.

Figure 6:
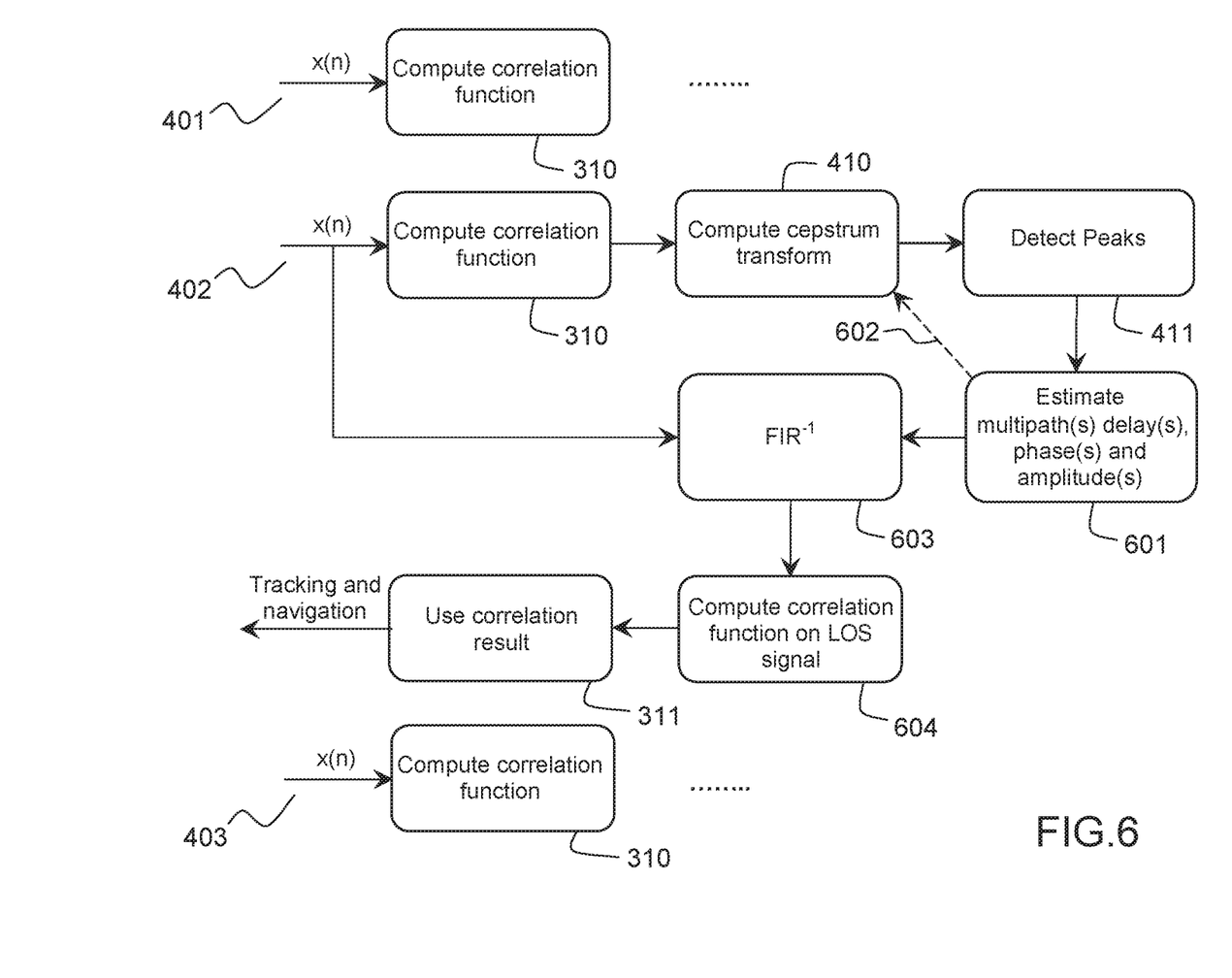
FIG. 6 illustrates another embodiment of the invention, wherein multipath reflections are identified using a cepstrum transform, and the received signal filtered.

FIG. 6 illustrates another embodiment of the invention, wherein multipath reflections are identified using a cepstrum transform, and used to design a Finite Impulse Response filter (FIR). The received signal is then filtered in order to mitigate the effects of the multipath reflections.

As in the first embodiment, a cepstrum transform 410 has to be performed on a first correlation function, and the peaks of the cepstrum transform analyzed (411) to search for peaks corresponding to reflected propagation paths.

However, in this embodiment, the estimated propagation characteristics of each of the reflected propagation paths further comprise a phase estimate of the associated signal. To retrieve this phase information, a complex cepstrum transform must be performed on the correlation function calculated from the received signal. The phase information is then determined considering the phase information of the complex gain α of the reflected path. The correlation process and the cepstrum transform can be done in a joint cepstrum correlation transform, as illustrated in FIG. 5b.

Similar to the first embodiment, estimating the characteristics of the reflected propagation paths can be performed iteratively by suppressing the contribution of each estimated reflected propagation path from the output of the correlation function (602), by constructing an estimated correlation function free from the previously calculated reflected propagation path contributions, using to that end the amplitude and delay of the reflected propagation path.

The estimated characteristics of the reflected propagation path are then used to filter the received signal, using a Finite Impulse Response filter (FIR). To this end, an estimate of the propagation channel is constructed, considering the LOS propagation path and the estimated reflected propagation paths. The estimated propagation channel is then inverted, the taps of the FIR being the values of the inverted propagation channel.

By filtering (603) the received signal x(n) with the calculated filter, the multipath reflections contained in the received signal are rejected. The resulting signal comprises the contribution of the LOS signal, and contributions of the low amplitude reflected signals that are too small to be detected as drowned in the white noise.

The signal is then computed (311) as in classical GNSS receiver, by performing a correlation (604) function that may implement an early minus late algorithm, or any other state of the art technique, to drive a tracking loop.

Considering the implementation cost of the invention, estimating the reflected propagation path, using a cepstrum transform on the output of the correlation function, requires implementing more correlators in the tracking loops than in classical GNSS receivers, as the correlation function has to be performed on a set of consecutive points, the size of the set being of at least three. However, this processing power is available in classical GNSS receivers, receivers implementing the MEDLL algorithm, which performs similar correlation measurements.

As the peak of the correlation function of GNSS signals has a size of about $2/f_c$ centered around the LOS path, $f_c$ being the chip frequency, multipath reflections delayed of more than one chip can be ignored. Thus, the time period covered by the set of correlators does not have to exceed one chip. In the case of L1CA GPS signal for instance, the chip frequency is 1.023 MHz. Multipath reflections delayed of more than one chip (which corresponds to delays of about 1 ms) does not have to be tracked and characterized.

In order to decrease the computing power required, the use of the multipath mitigation technique as described in the invention can be limited, in one embodiment, to the phases where a high accuracy is required, i.e. during the tracking phase when multipath propagations are affecting the quality of the positioning. Indeed, during the initialization phase, a coarse synchronization position estimate can be determined, using an early minus late method or any other suitable method, even in multipath propagation environment, as a high accuracy is not necessarily required.

During the tracking phase, when the propagation environment does not comprise reflected propagation paths, using the method according to the invention might not always be necessary. But when the propagation environment comprises reflected propagation paths, the multipath mitigation technique described in the invention increases advantageously the accuracy of the positioning.

In the initialization phase, once the coarse synchronization position is acquired, the synchronization position shifts due to the effects of the relative movement between the receiver and the satellite will be relatively small, at the scale of a PRN period. Thus, the set of correlation values calculated to perform the cepstrum transform can be limited to a small interval around the coarse synchronization position.

Figure 7:
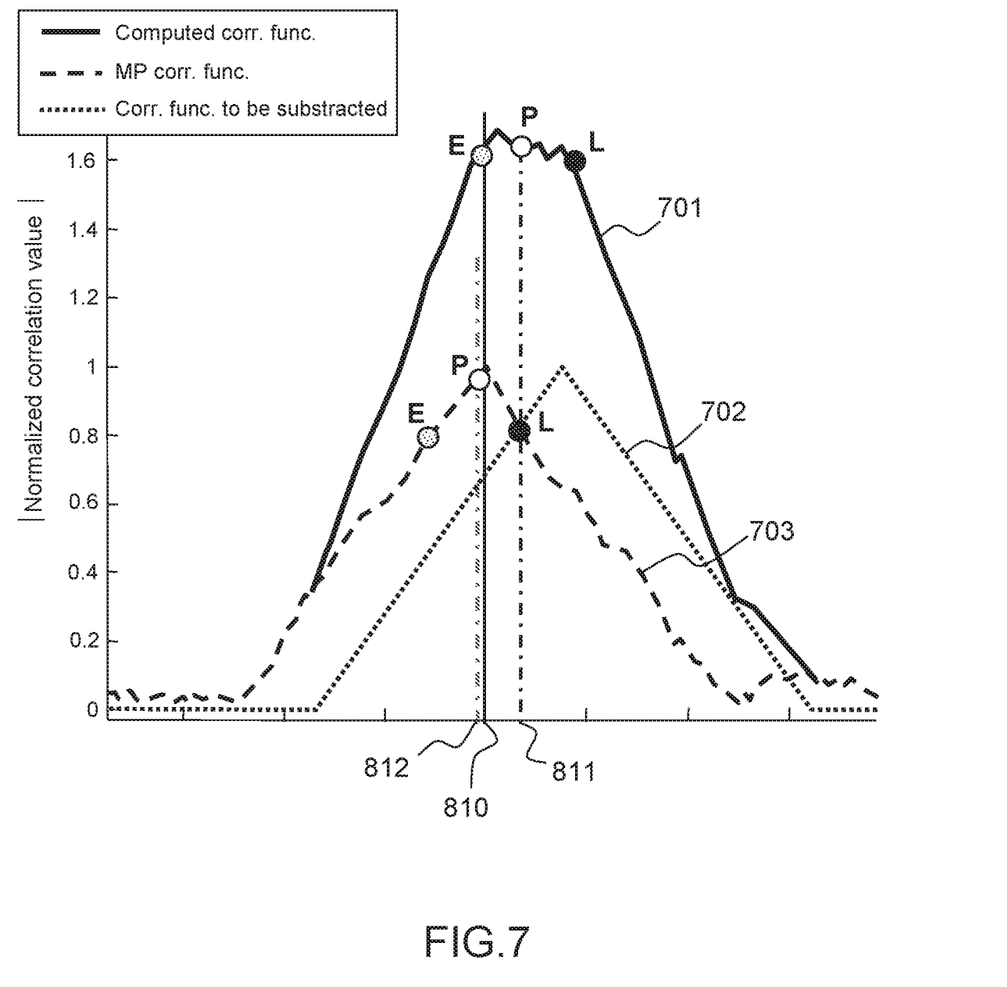
FIG. 7 represents an example of tracking position acquired in a receiver according to the invention.

FIG. 7 represents an example of tracking position acquired in a receiver according to the invention. It illustrates the gain reached by using a GNSS receiver according to the invention, with respect to a GNSS receiver that does not implement any multipath reflections mitigation technique.

In this example, done using computer simulation, a GNSS receiver implementing the first embodiment of the invention and receiving a GPS L1C/A signal is considered. The signal comprises two propagation paths: a direct (LOS) path, and a reflected (NLOS) path, the amplitude of the different paths being equal (worst case scenario), and the delay of the reflected propagation path being of about 0.2 chips. In the example, the early minus late synchronization method is applied, considering a chip spacing of 0.2 chips between the early and late positions.

The curve 701 is the output of the correlation. Similarly as in FIG. 1, the contribution of each of the propagation paths can be observed. Applying the early minus late synchronization method over this result leads to a synchronization position 711 that is delayed of about 0.1 chips from the expected synchronization position 710.

Performing a cepstrum transform on the curve 701, and detecting the amplitude and delay of the reflected propagation path, makes it possible to generate the estimated output of the correlation function 702, relative to the reflected propagation path only.

Curve 703 represents the result of subtracting the estimated correlation result 702 from the acquired correlation result 701. The resulting signal only comprises the LOS signal path contribution, and leads to a synchronization position 712 that is very close to the expected position 710.

Thus, the invention brings a clear, consistent improvement, even in a worst case multipath scenario, against estimation errors due to the multipath propagation environment. The remaining estimation error is due to the noise component of the reflected path correlation function, which cannot be estimated.

In addition, the multipath mitigation technique according to the invention further brings protection against spoofing.

The GNSS receiver according to the invention works independently of the considered signal and constellation, as it is not processing the received signal, but the output of a correlation function. As the processings are performed at the correlation level, multipath detection and mitigation are made easier, the signal coming from the other satellites being rejected by the despreading process. Basically, the invention is compliant with actual GNSS receivers and does not require new hardware development, as it consists in adding a set of processing to the classical processing workflow. It can be implemented via a software update on existing GNSS receivers.

Some additional processing is required to implement the invention, in particular the correlation of the received signal over a set of consecutive points. Using in one embodiment the invention only during specific periods of the receiving process, for instance the tracking phase, where the coarse position of the synchronization is known, makes this computation more efficient.

The invention can be performed in real time, and follows the variations of the propagation environment, that are prone to happen quickly when the receiver evolves in an urban environment. The correction is notably computed and applied for each satellite independently, which brings an additional flexibility.

The invention is based on a cepstrum computation, which can be, for instance, based on Fast Fourier Transforms, or Hartley transforms. These operations are well known and technologically efficient. The cepstrum computation can be performed jointly with the correlation computation. The main associated advantage is that this solution allows the use of already existing and efficient hardware functions present in a classical GNSS receiver device. Consequently, the complexity and the resource consumption are not increased as in other multipath mitigation technique, as for instance when implementing heavy multi-correlator methods.

The various embodiments of the invention, and in particular the cepstrum transform of the output of a correlation function, can be implemented in a GNSS receiver on any appropriate architecture. It applies to a GNSS positioning signal acquired at the output of an RF chain, preferably but not restricted to, in baseband or intermediate frequency. The various tracking loops and calculation circuits can be implemented on a calculation machine such as a software reprogrammable calculation machine (like a microprocessor, a microcontroller, or a digital signal processor (DSP)) or a dedicated calculation machine (as for example a Field Programmable Gate Array (FPGA), or an Application Specific Integrated Circuit (ASIC)). Any intermediate combination of analog and digital components is possible.

Figure 8:
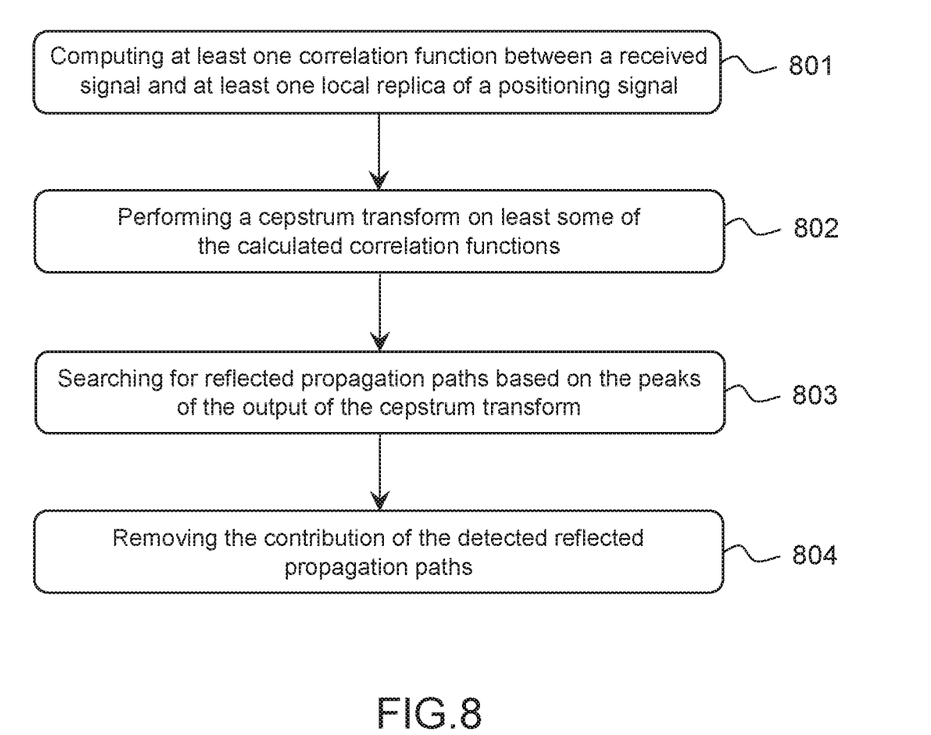
FIG. 8 represents a flow chart of a method according to the invention, for multipath mitigation in a GNSS receiver.

FIG. 8 represents a flow chart of a method according to the invention, for multipath mitigation in a GNSS receiver.

The method comprises a first step 801 of computing at least one first correlation function between the received signal and at least one local replica of a positioning signal.

General pattern consists in computing at least four correlation functions, on distinct positioning signals, to perform a PVT computation.

The method comprises a second step 802 of performing a cepstrum transform on at least some of the output of the first correlation functions. Indeed, the multipath mitigation technique according to the invention can be applied to each of the calculated correlation functions, or to a subset of these correlation functions.

The calculated correlation functions output must be the result of a correlation product calculation performed between the received signal and the local replica of said signal, generated at the receiver level on a set of at least three positions, the size of the correlation function having a direct impact on the accuracy of the multipath mitigation technique. The exact synchronization position must be comprised in the set of points. To that end, the set of points must be wide enough when the incertitude on the position of the synchronization position is high, and can be reduced otherwise.

The cepstrum transform can be based on Fourier transforms, Fast Fourier transforms (FFT) or Hartley transforms, and it can be real or complex, depending on the embodiment of the invention.

The method further comprises a third step 803 of searching for reflected propagation paths based on the peaks of the output of the cepstrum transform, and when reflected propagation paths are detected, determining the propagation characteristics associated to these paths.

The propagation characteristics comprise at least an amplitude and a delay for each of the reflected propagation paths. Depending on the embodiment of the invention, the phase of the reflected propagation paths can also be required.

Finally, the method comprises a fourth step 804 of removing the contribution of the detected reflected propagation paths.

In the embodiment represented in FIG. 4, this step is performed by generating an estimated second correlation function result relative to the NLOS signals, based on the estimated amplitude and phase of the detected reflected propagation paths. Said estimated correlation function result is then removed from the first computed correlation function result. Of course, the removal of the multiple propagation path contributions can be performed by generating one estimated correlation function result for each of the detected reflected propagation paths, and removing the contribution of these paths from the computed correlation function result one by one.

In the embodiment represented in FIG. 6, this step is performed by generating a finite response filter (FIR), inverting the coefficients of a composite propagation channel generated using the estimated amplitude, phase and delay of the reflected propagation paths, and filtering the received signal by said filter.

As previously described, the estimation of the propagation characteristics of the reflected propagation paths can be performed iteratively.

Although the various embodiments of the invention have been detailed in the case of a GNSS system for receiving positioning signals, it should be noted that the invention can also be applied in all the CDMA access techniques having to reject multipath reflections. The invention is particularly relevant as a low-cost solution when the resolution of the correlation step is not good enough to separate line-of-sight signal from replicas and when multipath signals don't bring more information. The application of the invention in such communication systems using CDMA access techniques may be based on the generalization of the device and process provided in this application. Further, the invention is not limited to satellite communications and may be integrated in a wide variety of transmissions systems, as for example drones, automotive industry applications, markets, in aerospace and avionics sectors, sensing applications, etc.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A receiver for receiving one or more RF signals, the one or more RF signals comprising a component relative to a direct propagation path and one or more additional components relative to reflected propagation paths of the one or more RF signals reflected by a propagation environment, the receiver comprising a calculation circuit configured to:
   compute at least a first correlation function between a received signal of the one or more RF signals and at least a replica of a RF signal generated at the receiver, and for at least an output of the first correlation function:
      perform a cepstrum transform,
      detect one or more reflected propagation paths from an output of the cepstrum transform, and determine propagation characteristics associated with the detected one or more reflected propagation paths, and
   remove contribution of the detected one or more reflected propagation paths from the received signal of the one or more RF signals, or the output of the first correlation function.

2. The receiver of claim 1, wherein the receiver is a GNSS receiver and the one or more RF signals comprising positioning signals.

3. The receiver of claim 1, wherein the propagation characteristics determined for each of the detected one or more reflected propagation paths comprise an amplitude and a delay, the calculation circuit being further configured to generate an output of a second correlation function based on the propagation characteristics of each of the detected one or more reflected propagation paths only, and to remove the contribution of the detected one or more reflected propagation paths from the output of the first correlation function by calculating a difference between the output of the first correlation function and the output of the second correlation function.

4. The receiver of claim 1, wherein the propagation characteristics determined for each of the detected one or more reflected propagation paths comprise an amplitude, a phase and a delay, the calculation circuit being further configured to use the propagation characteristics of the detected one or more reflected propagation paths to calculate a Finite Impulse Response filter, and to use said filter to remove the contributions of the detected one or more reflected propagation paths from the received signal.

5. The receiver of claim 1, wherein the performing a cepstrum transform, the detecting one or more reflected propagation paths from an output of the cepstrum transform and the determining propagation characteristics associated with the detected one or more reflected propagation paths are done iteratively; subsequent iterations taking as an input the output of the first correlation function from which the contribution of the previously detected reflected propagation paths have been removed.

6. The receiver of claim 1, wherein the cepstrum transform comprises a Hartley transform and an inverse Hartley transform.

7. The receiver of claim 1, wherein the first correlation function is computed in a frequency domain.

8. The receiver of claim 1, further configured to perform the cepstrum transform, the detection of the one or more reflected propagation paths, the determination of the associated propagation characteristics and the contribution removal during at least a phase of tracking of the received signal.

9. A method for mitigating multiple paths in a receiver configured to receive one or more RF signals, the one or more RF signals comprising a component relative to a direct propagation path and one or more additional components relative to reflected propagation paths of the one or more RF signals reflected by a propagation environment, the method comprising:
    computing at least a first correlation function between a received signal of the one or more RF signals and at least a replica of a RF signal generated at the receiver, and for at least an output of the first correlation function:
        performing a cepstrum transform,
        detect one or more reflected propagation paths from an output of the cepstrum transform, and determining propagation characteristics associated with the detected one or more reflected propagation paths,
    removing contribution of the detected one or more reflected propagation paths from the received signal of the one or more RF signals, or the output of the first correlation function.

10. The method of claim 9, wherein the receiver is a GNSS receiver and the one or more RF signals comprising positioning signals.

\* \* \* \* \*